3,527,085
METHOD AND APPARATUS FOR DETERMINING MOLECULAR WEIGHTS EMPLOYING A PRESSURE TRANSDUCER
Robert S. Silas and William J. Hines, Bartlesville, Okla., assignors to Phillips Petroleum Company, a corporation of Delaware
Filed Oct. 8, 1968, Ser. No. 765,788
Int. Cl. G07n 7/16
U.S. Cl. 73—64.2                                                            6 Claims

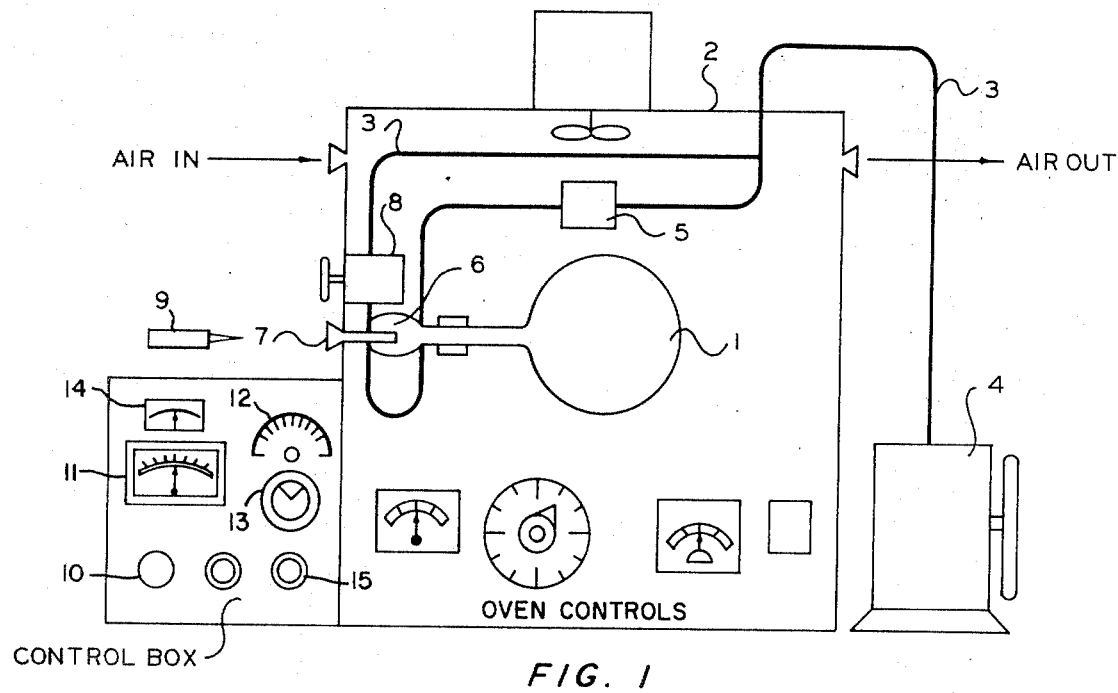
FIG. 1
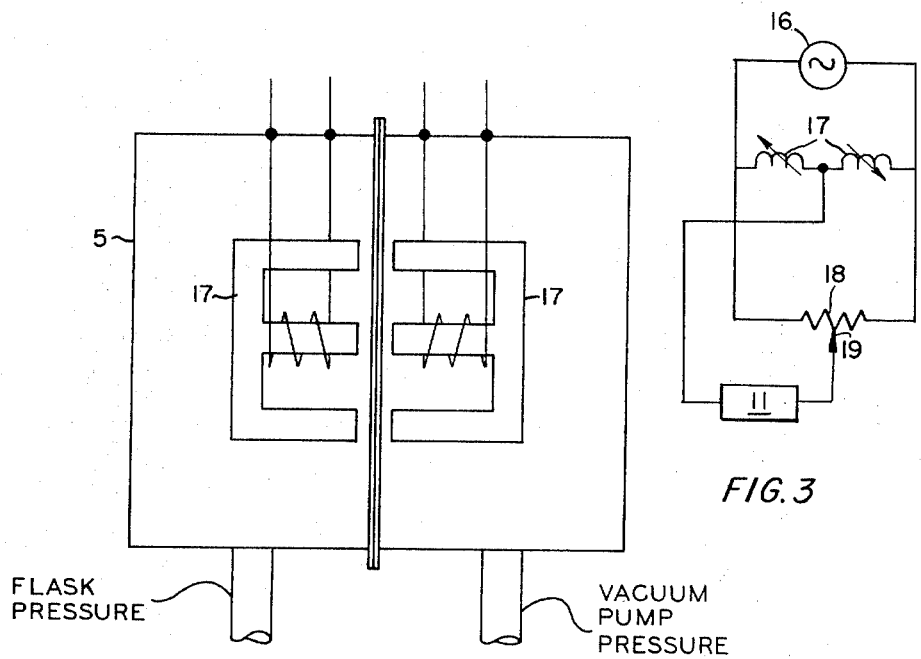
FIG. 2
FIG. 3
INVENTORS
R.S. SILAS
W.J. HINES
BY Young & Quigg
ATTORNEYS United States Patent Office 3,527,085
Patented Sept. 8, 1970

ABSTRACT OF THE DISCLOSURE

A method for determining molecular weight and vapor pressure of a sample by measuring the pressure generated from the vaporization of a known weight of sample at constant volume and known temperature. The apparatus comprises a sample evaporation container. A vacuum pump is connected to one side of a transducer and through a shut-off valve to said container. The container is connected to the other side of the transducer. Means are provided for introducing a sample into said container.

---

Figure 4:
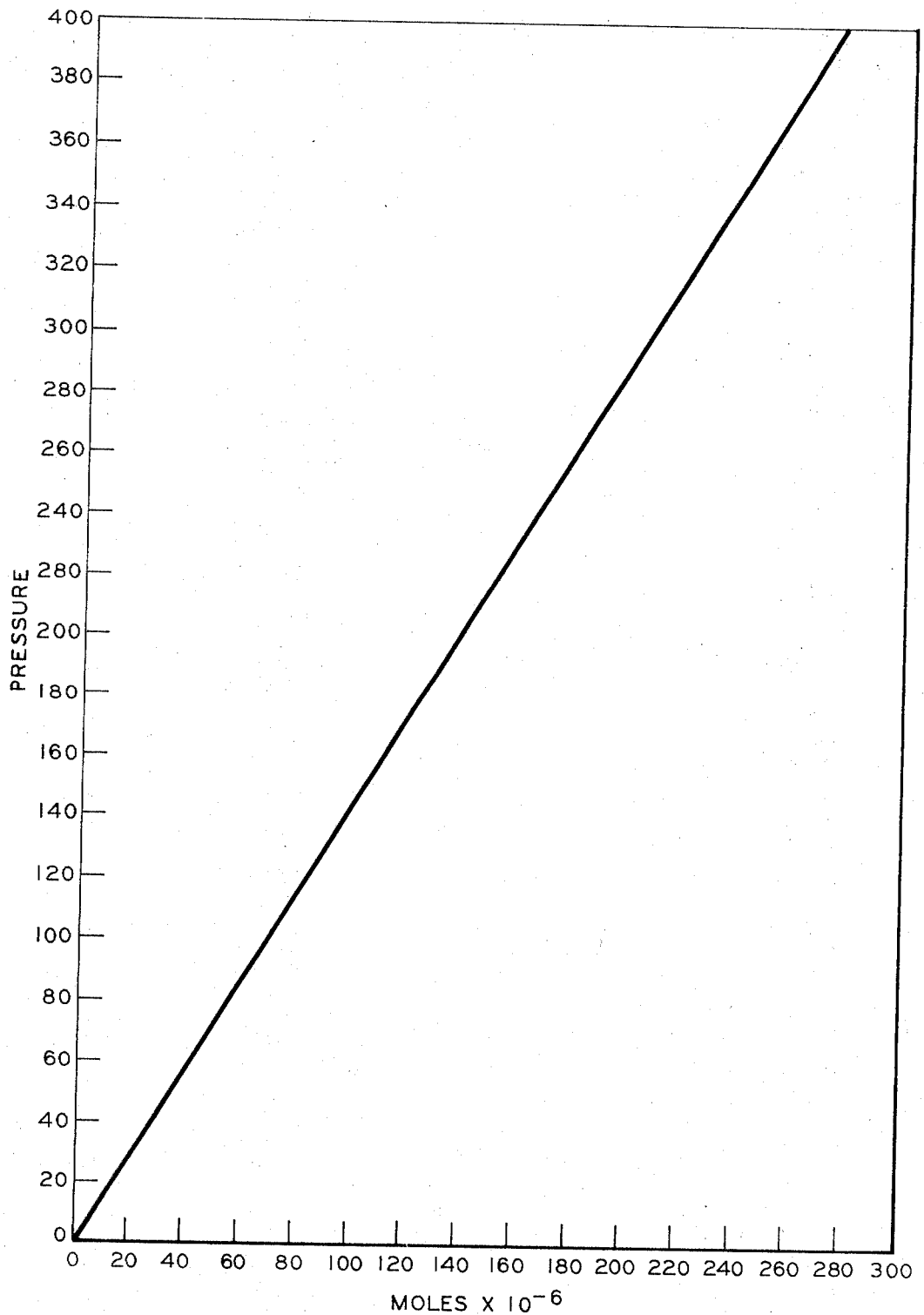

This invention relates to the determination of molecular weights. It also relates to the measurement of vapor pressure. In one of its aspects it relates to the determination of molecular weights by a vapor density-pressure method. In another of its aspects the invention relates to the determination of vapor pressures and of molecular weights by an apparatus suitable for determining the pressure generated by the vaporization of a sample at a constant volume and known temperature.

In one of its concepts the invention provides a method for measuring the pressure produced upon vaporization of a sample employing a pressure sensitive transducer. In one embodiment this transducer is a variable reluctance pressure transducer which is capable of being operated in conjunction with a signal responsive indicator to provide a direct-reading pressure measurement system. In another of its concepts the invention provides a method for determining molecular weight in which a known weight of a sample is completely vaporized at a constant volume and a known temperature and the pressure is measured employing a transducer as herein described. In a further concept the invention provides a method for determining vapor pressure, employing such a transducer, in which a sample is heated to vaporize the same, but is in equilibrium with its liquid. In a still further concept the invention provides an apparatus comprising in combination a sample containing a vaporization means, means for heating said sample containing means, means for reducing the pressure in said sample containing means, means connected to said last mentioned means and to said sample containing means comprising a pressure sensitive transducer, means for connecting said sample containing means, and said means for reducing the pressure in said sample containing means, means for blocking the connection between said sample containing means and said pressure reducing means as connected to said sample containing means, and means for detecting a signal from said transducer emitted thereby responsive to a change in pressure in said sample containing means when a sample has been introduced thereinto at a given pressure and temperature to which the apparatus has been adjusted.

Recent developments in the synthesis of low molecular weight, volatile liquids such as alcohols, organic acids, esters, amines, etc., have necessitated the investigation of different molecular weight methods than those previously used. Methods such as cryoscopic, ebullioscopic and vapor pressure osmometry are not applicable to a large percentage of these liquid materials because of their high volatility, apparent association or excessive time required to make the necessary measurements.

The classical way to determine the molecular weights of volatile organic liquids is by using one of two groups of vapor density methods: (1) the constant volume method in which the weight of a known volume of vapor is measured, or (2) the constant pressure method in which the volume of a known weight of vapor is measured. Bonnar et al., "Number Average Molecular Weights," Interscience Publishers, Inc., New York, 1958, pp. 281–297, describe a typical vapor density method and give data that indicate the precision that can be expected from such methods (standard deviations of 0.65 for 31 independent estimates of error). Vapor density molecular weight methods have been limited to rather low numbers. The difficulty has been that of making measurements under conditions where the vapors behave as an ideal gas or where the deviations from an ideal gas can be easily taken into account.

In addition to the two classes of vapor density molecular weight methods mentioned above, Young and Taylor, Anal. Chem. 19, 135–137 (1947), vaporized a small, accurately measured quantity of liquid into an evacuated 2-liter vessel, at room temperature, and measured the resulting pressure with a vacuum micromanometer. These authors give molecular weight data for a number of organic liquids having vapor pressures in the range of 750 to 0.3 mm. of mercury at room temperature. The information given by these authors indicates that an average accuracy of 2 percent may be expected from the method and that a determination can be made in about 4 minutes.

Further, the rapid yet accurate determination of the vapor pressure of compounds of low volatility presents a challenge as is known in the art.

It is an object of this invention to provide a method for the rapid, yet accurate determination of vapor pressure of a sample. It is another object of this invention to provide a method and apparatus for determining molecular weights rapidly and accurately. It is a further object of this invention to provide method and apparatus for determination of molecular weight or vapor pressure by a vapor density-pressure transducer operation and apparatus. It is a further object of this invention to provide for the easy measurement of molecular weight of volatile, associated materials, etc., previously difficult to determine. A still further object of this invention is to provide for the determination of the vapor pressure of materials having a low volatility. It is a further object of this invention to provide method and apparatus employing or using variable reluctance transducer in a manner as set forth elsewhere herein. It is a still further object of this invention to provide a readily assembled, readily used, and highly accurate apparatus for vapor density-molecular weight or vapor pressure determinations.

Other aspects, concepts, and objects as well as the several advantages of the invention, are apparent from a study of this disclosure, the drawing and the appended claims.

According to the present invention, there has been provided a method for determining the vapor pressure or the molecular weight of a substance using the vapor density method which comprises when determining the molecular weight of a substance measuring the pressure generated from the complete vaporization at a known temperature and volume of a known weight of a sample of said substance employing the following steps:

(1) Connecting a flask of known volume to one side of the diaphragm of a variable reluctance pressure transducer so that said diaphragm will be acted upon by pressure in said flask, (2) Connecting a vacuum pump to the other side of said transducer so that the other side of said diaphragm will be acted on by said pump, (3) Heating the system thus constructed to a desired temperature,
(4) Evacuating the system to a desired low pressure,
(5) Zeroing the transducer at said pressure and said temperature,
(6) Introducing a known weight of a sample into said flask and,
(7) Measuring the resulting pressure increase by means of the output of said transducer at said temperature and at said pressure.

Referring to the drawing, FIG. 1 is a schematic showing of a vapor density-molecular weight determination apparatus according to the invention. FIG. 2 is a diagrammatic simplified schematic illustration of a magnetic reluctance differential pressure transducer.

Figure 5:
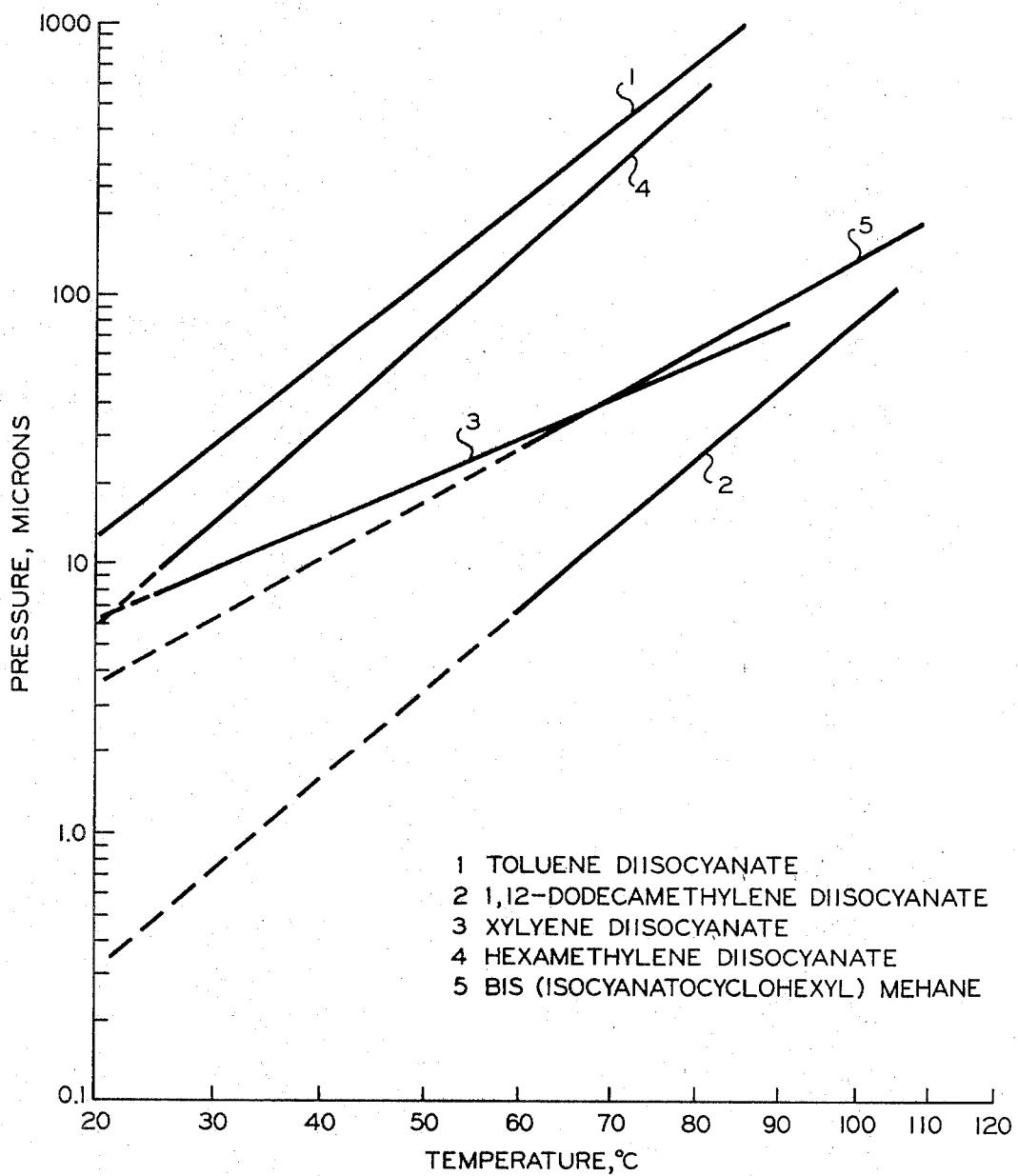

FIG. 4 is a typical calibration curve for determining molecular weights by vapor density obtained using the apparatus according to the method of the invention. FIG. 5 is a series of vapor pressure curves.

Referring now to FIG. 1, the apparatus developed consists of a flask 1 enclosed in a heavy-duty oven 2. The flask is connected by pipe 3 to a vacuum pump 4 one one side of a differential pressure transducer 5 and to a heated sample injection port 6 equipped with a rubber septum 7. The other side of pressure transducer 5 is connected to vacuum pump 4 so that pressure measurements can be measured against vacuum. A flask shutoff valve 8 is provided and is open until the transducer has been zeroed and then it is closed. The pressure transducer is "zeroed" while pulling a vacuum on both sides of a diaphragm in the transducer. The pressure transducer indicator 11 is zeroed using a null control 10 while the vacuum is pulled on both sides of the diaphragm in the transducer. A meter sensitivity suppression control switch 12 is used to set the sensitivity on the transducer indicator 11. An injection port powerstatt 13 is used to control the temperature of injection port 6 shown by indicator 14. A five-liter flask, in the embodiment being described, is then isolated from the vacuum pump by closing valve 8. A weighed quantity of sample is injected into the flask with a hypodermic syringe 9. The resulting pressure is then measured by renulling the transducer indicator 11 with the digital control potentiometer 15.

Referring to FIG. 3, the apparatus consists of an alternating current source 16, inductance coils 17 for alternating current in which the arrow implies a coil with core, resistance 18, zero contact point 19 for the transducer indicator 11 earlier described.

In operation, the zero control moves contact 19 with respect to resistance 18 until the current indication on the meter 11 is zero. This balances the Wheatstone bridge composed of the two parts of the resistance 18 and the two inductance coils 17. When a pressure difference exists, the two reluctances of the induction coils change relative to each other and a net current is produced on the transducer indicator 11.

The usual electrical wiring which one skilled in the electrical wiring art can supply routinely are omitted for simplicity sake.

The molecular weight of the sample can now be obtained by employing the equation as follows:

$$M = g\frac{RT}{PV}$$

where,

M is the molecular weight,
g is the weight of the sample and
P is the pressure measured by means of the transducer.

The volume V and the temperature T are constant; R is the ideal gas constant.

The following information is given by way of making a more full disclosure. It will be understood by one skilled in the art having possession of this disclosure that substitute equipment or equivalent components or component for any one or more components can be utilized.

The oven used was one capable of operating continuously at 150 plus or minus 0.1 C.

The pressure transducer was a variable reluctance type that was installed with a 0.1 p.s.i.g. diaphragm capable of continuous operation at 350° F. (170° C.).

An indicator to provide a direct reading pressure measurement system was connected to the transducer and pressure reading was made on a 3-digit dual suppression control potentiometer, using a voltmeter as a null balance indicator.

The indicated amounts of sample were introduced using 50 and 100 microliter capacity syringes to inject through a silicone rubber septum having a ⅜ inch outside diameter.

A Welch Duo-Seal Vacuum Pump, Model R-1400, was used.

Referring now to FIG. 1, the pressure transducer assembly essentially consists of two parts: (a) a variable reluctance pressure transducer and (b) a transducer indicator. In the pressure transducer (FIG. 2, a detailed drawing of 5 of FIG. 1), a 416 stainless steel diaphragm (magnetically permeable) is clamped between two blocks of the same kind of steel. One side of the diaphragm is exposed to the vacuum pump while the other side is exposed to the flask. When the same pressure exists on both sides of the diaphragm, it remains at rest. If, however, a vacuum exists on the pump side and a sample pressure exists on the flask side, the diaphragm is displaced. An "E" core and coil assembly is embedded in each of the two stainless steel blocks, with a small gap between the diaphragm and the "E" core, in a symmetrical arrangement resulting in a condition of equal inductance when the diaphragm is not deflected. With unequal pressures on the two sides of the diaphragm, deflection results in an increase in the gap in the magnetic flux path of one "E" core, and an equal decrease in the other. The magnetic reluctance varies with the gap and determines the induction value, so that the effect resulting from a deflection of the diaphragm is a change in the inductance of the two coils. Two legs of the Wheatstone bridge, FIG. 3, are formed by the two "E" core coils, FIG. 2, the other two arms being resistances. When the bridge is in balance, the null meter on the transducer indicator reads zero. When a sample of volatile liquid is introduced into the flask, the resulting pressure deflects the diaphragm. This produces an unbalance in the bridge and the null is regained by rotating the digital control potentiometer on the transducer indicator. The value directly proportional to the pressure is then read directly on the potentiometer dial.

For the work, results of which are indicated herein, the following calibration materials were used.

HYDROCARBONS

Unless otherwise indicated, the calibration hydrocarbons used in this work were Research Grade, Special Products Division, Chemical Department, Phillips Petroleum Company, Bartlesville, Okla.

ORGANIC ACIDS

Heptanoic acid, 99.5 percent purity, No. A-100A, Lachat Chemicals Company, Inc., Chicago, Ill., and Distillation Products Industries, Eastman Organic Chemicals Department. Nonanoic acid, 99.5 percent purity, No. A-101A, Lachat Chemicals Co.

ALCOHOLS

Decanol and Pentanol, 99.5 percent purity, Lachat Chemicals Co., Inc.

Calibration data are given in Tables I, III, and IV below. These data were obtained by carrying out the following steps:

(a) With the valve to the 5-liter flask open, the system was evacuated until the pressure was constant.

(b) The meter sensitivity suppression control switch was turned to the most sensitive position and the voltmeter needle zeroed with the null control.

(c) The sensitivity suppression control switch was turned to the low position.

(d) A hypodermic syringe was filled with the desired amount of calibration material and weighed on an analytical balance (20–40 mg. of material were generally used in this work).

(e) After closing the valve to the flask, the weighed calibration standard in the syringe was injected through the injection port into the flask. The syringe was again weighed.

(f) With the sensitivity suppression control which on highest sensitivity, the voltmeter needle was zeroed by turning the digital potentiometer and the pressure reading recorded.

(g) The valve to the flask was opened and the system evacuated for the next determination.

(h) Moles used from the calculated weight of the calibration standard and the molecular weight of the standard.

(i) After the calibration data had been obtained for a number of standard materials, the slope, M, and the intercept, b, were calculated using the following equation:

$$P = m\frac{g}{M} + b$$

wherein:

P is the pressure
$g/M$ is moles,
M is the molecular weight of the calibration standard and
b is the intercept.

Moles $\times 10^6$ and the corresponding pressure readings were put into an IBM 7094 computer. The data from the computer included the slope, $m$, and the intercept, $b$. If the value of intercept, $b$, was less than one (1), it was omitted.

An alternate calibration procedure may be used when ultimate accuracy is not required. This alternate procedure uses a calibration line as shown in FIG. 3. When this type of calibration is used, moles vs. pressure are plotted for several calibration points.

Molecular weights as shown in Tables II, V and VI were determined following a procedure similar to that given herein for calibration of the apparatus or instrument. The sample was substituted for the calibration material and then the molecular weight of the sample was calculated by means of the following equation:

$$\text{Molecular weight} = \frac{1000\ m. \times mg.\ \text{of sample}}{P - b}$$

wherein:

$m$ is the slope of the calibration line and
$b$ is the intercept (when the intercept is less than one (1), the term $b$ is omitted).

When the alternate method is used for calibration, moles for the corresponding pressure are obtained from a graph as in FIG. 3 and the molecular weight of the sample calculated by means of the following equation:

$$\text{Molecular weight} = \frac{\text{grams of sample}}{\text{moles}}$$

Molecular weights have been determined for several types of volatile organic liquids such as n-paraffins, olefins, aromatics, cycloparaffins, organic amines, alcohols, water, organic acids, esters and formamides. Calibration data are given in Table I (for hydrocarbons), Table III (for organic acids) and Table IV (for alcohols). These data (moles $\times 10^6$ vs. pressure transducer reading for each calibration point) were computed. The slopes for the calibration lines for hydrocarbons, organic acids and alcohols (the intercepts were small and therefore omitted) were calculated as follows:

(a) Slope $m$ for hydrocarbons = 1.049
(b) Slope $m$ for alcohols = 1.028
(c) Slope $m$ for organic acids = 1.009

Molecular weight determinations were made on n-hexadecane, n-decane, n-nonene, n-octane, n-heptane, cycloheptane and ethylbenzene. The molecular weight data for these hydrocarbons are given in Table II.

Molecular weight determinations were made on organic acids and alcohols of known purity. These molecular weight data are given in Table V.

TABLE I.—CALIBRATION DATA FOR HYDROCARBONS

| Compound | Grams of sample | Moles×10⁶ | Pressure (transducer reading) |
| --- | --- | --- | --- |
| Benzene | 0.0267 | 341.8 | 359.00 |
|  | 0.0354 | 453.0 | 475.00 |
| n-Decane | 0.0411 | 288.9 | 304.56 |
|  | 0.0412 | 289.6 | 303.60 |
|  | 0.0303 | 213.0 | 223.00 |
|  | 0.0153 | 107.5 | 114.61 |
|  | 0.0446 | 313.5 | 326.15 |
|  | 0.0302 | 212.3 | 223.65 |
| n-Octane | 0.0287 | 251.3 | 263.66 |
|  | 0.0078 | 68.29 | 71.30 |
|  | 0.0042 | 36.77 | 39.21 |
|  | 0.00274 | 23.99 | 25.72 |
|  | 0.0428 | 374.7 | 388.62 |
|  | 0.0289 | 253.0 | 262.42 |
|  | 0.0396 | 346.7 | 361.27 |
|  | 0.0218 | 100.9 | 196.58 |
|  | 0.0149 | 130.5 | 135.68 |
|  | 0 | 0 | 0 |

TABLE II.—MOLECULAR WEIGHT DATA FOR HYDROCARBONS

| | Hydrocarbons | | | | | | |
| --- | --- | --- | --- | --- | --- | --- | --- |
| | n-Hexadecane [1] | n-Decane | 1-Nonene [2] | n-Octane | n-Heptane | Cycloheptane [1] | Ethylbenzene |
| | 227.17 | 141.56 | 126.76 | 114.19 | 101.40 | 99.23 | 107.70 |
| | 226.55 | 142.35 | 125.90 | 114.76 | 100.80 | 99.08 | 105.21 |
| | 225.49 | 142.53 | 124.57 | 112.36 | 100.80 | 97.75 | 106.76 |
| | 224.90 | 143.94 | 125.36 | 111.75 | 100.30 |  | 107.56 |
| | 226.20 | 143.45 | 126.66 | 115.53 | 100.50 |  | 106.28 |
| |  | 141.65 |  | 115.52 |  |  |  |
| |  |  |  | 114.98 |  |  |  |
| |  |  |  | 116.33 |  |  |  |
| |  |  |  | 115.20 |  |  |  |
| Mean ($\bar{X}$) | 226.06 | 142.58 | 125.85 | 114.52 | 100.76 | 98.69 | 106.70 |
| Theoretical molecular weight | 226.45 | 142.29 | 126.24 | 114.23 | 100.20 | 99.19 | 106.17 |
| Degrees of freedom | 4 | 5 | 4 | 8 | 4 | 2 | 4 |
| Standard deviation | 0.889 | 0.956 | 0.917 | 1.62 | 0.416 | 0.815 | 1.02 |
| Repeatability | 3.49 | 3.45 | 3.60 | 5.28 | 1.63 | 4.96 | 3.99 |
| Pooled standard deviation (31 degrees of freedom) |  |  |  |  |  | 1.07 |  |
| Repeatability (31 degrees of freedom) |  |  |  |  |  | 3.10 |  |

[1] Chemical Samples Co.    [2] API Certified Hydrocarbon, Petroleum Research Laboratory, Carnegie Institute of Technology.

TABLE III.—CALIBRATION DATA FOR ORGANIC ACIDS

| Compound | Grams of sample | Moles×10⁶ | Pressure (transducer reading) |
|---|---|---|---|
| Heptanoic acid | 0.0090 | 69.14 | 70.18 |
| Do | 0.0144 | 108.3 | 110.60 |
| Do | 0.0181 | 140.6 | 141.87 |
| Do | 0.0188 | 144.2 | 146.21 |
| Heptanoic acid | 0.0186 | 144.8 | 147.30 |
| Dimethylethylcarboxylic acid | 0.001921 | 16.56 | 17.13 |
| Do.¹ | 0.003460 | 28.93 | 30.85 |
| Do | 0.0189 | 162.9 | 165.00 |
| Nonanoic acid | 0.0094 | 59.41 | 60.24 |
| Do | 0.0050 | 31.60 | 32.29 |

¹ Microbalance used.

TABLE IV.—CALIBRATION DATA FOR ALCOHOLS

| Compound | Grams of sample | Moles×10⁶ | Pressure (transducer reading) |
|---|---|---|---|
| n-Decanol | 0.1700 | 107.4 | 109.30 |
| Do.¹ | 0.00460 | 29.06 | 29.00 |
| Do.¹ | 0.00860 | 54.33 | 55.12 |
| Do | 0.01263 | 79.79 | 81.69 |
| Do | 0.02130 | 134.6 | 136.38 |
| Do | 0.02270 | 143.4 | 145.99 |
| n-Pentanol | 0.00359 | 40.73 | 42.18 |
| Do | 0.01539 | 174.6 | 180.47 |

¹ Microbalance used.

TABLE V.—MOLECULAR WEIGHT DATA FOR ORGANIC ACIDS AND ALCOHOLS USING A PRESSURE TRANSDUCER

| | Nonanoic acid | Pentanoic acid | 1-nonanol | 1-heptanol |
|---|---|---|---|---|
| | 158.40 | 101.04 | 143.01 | 116.52 |
| | 159.67 | 101.10 | 144.53 | 116.54 |
| | 157.73 | 102.00 | 143.31 | 115.17 |
| | 160.47 | 102.66 | 143.29 | 115.44 |
| | 159.02 | 102.72 | | 115.49 |
| | | 101.34 | | 115.50 |
| | | | | 114.86 |
| Mean ($\bar{X}$) | 159.05 | 101.81 | 143.53 | 115.65 |
| Theoretical molecular weight | 158.23 | 102.13 | 144.25 | 116.20 |
| Degrees of freedom | 4 | 5 | 3 | 6 |
| Standard deviation | 1.07 | 0.762 | 0.677 | 0.614 |
| Repeatability | 4.20 | 2.75 | 3.05 | 2.23 |
| Pooled standard deviation for organic acids (9 degrees of freedom) | | | 0.911 | |
| Repeatability for acids | | | 2.91 | |
| Pooled standard deviation for alcohols (9 degrees of freedom) | | | 9.656 | |
| Repeatability for alcohols | | | 2.99 | |

TABLE VI.—ACCURACY OF VAPOR DENSITY METHOD

| Compound | Number of determinations | Molecular weight Found | Molecular weight Theoretical | Difference | Relative error, percent |
|---|---|---|---|---|---|
| n-Hexadecane | 5 | 226.06 | 226.45 | −0.39 | 0.17 |
| n-Decane | 6 | 142.58 | 142.29 | +0.29 | 0.20 |
| n-Nonene | 5 | 125.85 | 126.24 | −0.39 | 0.31 |
| n-Octane | 9 | 114.52 | 114.23 | +0.29 | 0.25 |
| n-Heptane | 5 | 100.76 | 100.20 | +0.56 | 0.56 |
| Cycloheptane | 3 | 98.69 | 98.19 | +0.50 | 0.50 |
| Ethylbenzene | 5 | 106.70 | 106.17 | +0.53 | 0.50 |
| Average percent relative error (hydrocarbons) | | | | | 0.36 |
| 1-nonanol | 4 | 143.53 | 144.25 | −0.72 | 0.50 |
| 1-heptanol | 7 | 115.65 | 116.20 | −0.55 | 0.48 |
| Average percent relative error (alcohols) | | | | | 0.49 |
| Pelargonic (n-C₉) acid | 5 | 159.05 | 158.23 | +0.82 | 0.52 |
| Valeric (n-C₅) acid | 6 | 101.81 | 102.13 | −0.32 | 0.31 |
| Average percent relative error (organic acids) | | | | | 0.41 |

A statistical analysis of data given in the tables and additional data as indicated in a standard deviation of 0.971 (71 degrees of freedom) and a repeatability of 2.75.

As the data in Table VI show, the average relative error varied from 0.36 to 0.49 percent when this method was applied to a series of hydrocarbons, alcohols and organic acids of known purity, the molecular weight which range from 98 to 225.

It will be evident to one skilled in the art in possession of this disclosure having studied the same that the results given in the above tables indicate that the method of invention is applicable to a wide variety of volatile organic liquids or materials. Account will be taken of those materials which may be polymeric in the vapor state. Ordinarily, any compound boiling below about 250° C. at atmospheric pressure should have a sufficient vapor pressure at a temperature at which the apparatus can be operated for making a molecular weight determination therewith according to the method for this invention.

Approximately five minutes of operator time are required for a molecular weight determination according to the method of the disclosed invention. Depending upon the evacuation system used, the five liter flask disclosed can be evacuated in a period of time of the order of a minor proportion of an hour, say, ten minutes for rather volatile materials such as hexane, up to 40 minutes for higher molecular weight materials, such as hexadecane. With more elaborate evacuation systems than the one used these times can be considerably shortened.

An advantage of the invention in its employment of a pressure transducer permits elimination of extremely high vacuums and also exposure to reactive substances such as oil and mercury.

As noted, the invention is suitable for determining the vapor pressure of materials having a relatively low volatility. When vapor pressure is to be measured, as one skilled in the art in possession of this disclosure having studied the same, will understand, enough of the sample is used to provide at equilibrium at the temperature at which the vapor pressure is to be measured or read both vapor and liquid in the flask.

Referring now to FIG. 4, the vapor pressure curves or graphs are those of the respective diisocyanates indicated. The data employed in the production of the graphs show that vapor pressures in the range of .3 to 13 microns for the respective materials have been determined and that these data correlate well with information which has been given in the literature, albeit this information is somewhat limited.

The method and apparatus of the invention will, as it appears from the foregoing and that which follows, be suitable for measurement of vapor pressure where vapor pressure is critical in the characterization and/or specification of compounds of relatively very low volatility.

Reasonable variation and modification are possible within the scope of the foregoing disclosure of the invention the essence of which is that the use of a pressure transducer, for example, a variable reluctance pressure transducer has been incorporated into a method and into an apparatus for vapor pressure or vapor density-molecular weight determinations, the transducer being located intermediate the sample vaporization flask and evacuation means such as a vacuum pump, the pump also being connected directly to said flask with cut-off means in the line so that the transducer can be zeroed, the entire system being so arranged and housed, for example, in an oven, as to be heatable to a predetermined temperature and so equipped with collateral equipment as to permit, substantially as described, a direct reading of the pressure increase in the system caused by a sample when vapor pressure is being determined and by a known quantity of a sample when a molecular weight determination is being made.

We claim:

1. An apparatus which comprises in combination container means for evaporating at a constant temperature a sample, means for introducing a sample into said container means for evaporating to be responsive to the pressure in said means for evaporating, means for evacuating connected to said transducer for affecting the pressure therein on the side opposite to that to which said means for evaporating is connected, said means for evacuating also being connected to said means for evaporating, means intermediate said evacuating means and said means for evaporating for shutting off the means communicating said means for evacuating and said means for evaporating, means for heating the entire assembly, means operatively connected to said transducer for detecting a change in the difference in pressures on the two sides thereof, and means for zeroing said transducer.

2. An apparatus according to claim 1 wherein the transducer is a variable reluctance type transducer and it is in circuit with a bridge whereby there is produced an output voltage proportional to said pressure difference.

3. An apparatus according to claim 1 wherein the means for evaporating has a known volume adapted to receive a known weight of a sample and the means for evaporating is capable of evaporating completely the introduced sample.

4. An apparatus according to claim 3 wherein the transducer is a variable reluctance type transducer and it is in circuit with a bridge whereby there is produced an output voltage proportional to said pressure difference.

5. A method for determining vapor pressure of a substance using the vapor density method which comprises measuring the pressure generated from the vaporization at a known temperature of a sample of said substance employing the following steps:
(a) connecting a flask to one side of the diaphragm of a variable reluctance pressure transducer so that said diaphragm will be acted upon by the pressure in said flask,
(b) connecting a vacuum pump to the other side of said transducer so that the other side of said diaphragm will be acted on by said pump,
(c) heating the system thus constituted to a desired temperature,
(d) zeroing the transducer at a selected pressure at said temperature,
(e) introducing a sample,
(f) the amount of sample being sufficient to provide at the temperature at which measurement is made a vapor-liquid equilibrium thereof, and measuring the resulting vapor pressure.

6. A method for determining molecular weight of a substance using the vapor density method which comprises measuring the pressure generated from the vaporization at a known temperature of a sample of said substance employing the following steps:
(a) connecting a flask to one side of the diaphragm of a variable reluctance pressure transducer so that said diaphragm will be acted upon by the pressure in said flask,
(b) connecting a vacuum pump to the other side of said transducer so that the other side of said diaphragm will be acted on by said pump,
(c) heating the system thus constituted to a desired temperature,
(d) zeroing the transducer at a selected pressure at said temperature,
(e) introducing a known weight of the sample into a flask of known volume and completely vaporizing said sample, and then
(f) measuring the resulting pressure increase by means of output of said transducer and calculating the molecular weight of the sample by employing the equation as follows:

$$M = g\frac{RT}{PV}$$

wherein:

M is the molecular weight,
g is the weight of the sample,
P is the pressure measured by means of the transducer
V and T being respectively volume and temperature, which are constant, and
R being the ideal gas constant.

References Cited

UNITED STATES PATENTS

| | | | |
|---|---|---|---|
| 2,645,949 | 7/1953 | De Boisblanc | 73—64.2 |
| 2,769,341 | 11/1956 | De Boisblanc | 73—64.2 X |

FOREIGN PATENTS 1,157,410  11/1963  Germany.

LOUIS R. PRINCE, Primary Examiner

J. W. ROSKOS, Assistant Examiner

U.S. Cl. X.R.

73—29

UNITED STATES PATENT OFFICE

CERTIFICATE OF CORRECTION

Patent No. 3,527,085     R. S. Silas     Dated: September 8, 1970
                      W. J. Hines It is certified that error appears in the above-identified patent and that said Letters Patent are hereby corrected as shown below:

Column 9, line 9, claim 1, line 4, after "evaporating" insert --- , a transducer connected to said container means to be in communication therewith and thus ---;

Column 9, line 10, claim 1, line 5, after "said" insert ---container ---;

Column 9, line 12, claim 1, line 7, after "said" insert --- container ---;

Column 9, line 14, claim 1, line 9, after "to" insert --- communicate with ---;

Column 9, line 16, claim 1, line 11, delete "means communicating" and insert --- communication between ---.

SIGNED AND
SEALED
DEC 29 1970

(SEAL)
Attest:

Edward M. Fletcher, Jr.
Attesting Officer

WILLIAM E. SCHUYLER, JR.
Commissioner of Patents